(12) United States Patent
Pogorelik

(10) Patent No.: US 11,077,763 B2
(45) Date of Patent: Aug. 3, 2021

(54) INTER ELECTRIC VEHICLE CHARGE TRANSFER

(71) Applicant: Intel Corporation, Santa Clara, CA (US)

(72) Inventor: Oleg Pogorelik, Lapid (IL)

(73) Assignee: Intel Corporation, Santa Clara, CA (US)

( * ) Notice: Subject to any disclaimer, the term of this patent is extended or adjusted under 35 U.S.C. 154(b) by 186 days.

(21) Appl. No.: 16/012,819

(22) Filed: Jun. 20, 2018

(65) Prior Publication Data

US 2019/0047427 A1 Feb. 14, 2019

(51) Int. Cl.
| | |
|---|---|
| *B60L 53/16* | (2019.01) |
| *G06Q 20/22* | (2012.01) |
| *B60L 53/66* | (2019.01) |
| *G06Q 20/14* | (2012.01) |
| *G07F 15/00* | (2006.01) |
| *G06Q 20/38* | (2012.01) |
| *G06Q 20/40* | (2012.01) |

(52) U.S. Cl.
CPC ............ *B60L 53/16* (2019.02); *B60L 53/665* (2019.02); *G06Q 20/145* (2013.01); *G06Q 20/223* (2013.01); *G06Q 20/387* (2013.01); *G06Q 20/405* (2013.01); *G07F 15/005* (2013.01); *B60L 2210/42* (2013.01)

(58) Field of Classification Search
CPC ..... B60L 53/16; B60L 53/665; G06Q 20/145; G06Q 20/223
See application file for complete search history.

(56) References Cited

U.S. PATENT DOCUMENTS

| | | | |
|---|---|---|---|
| 9,260,024 B1* | 2/2016 | Lau ...................... | B60L 53/14 |
| 2011/0202219 A1* | 8/2011 | Ishibashi ............... | B60L 53/65 |
| | | | 701/22 |
| 2012/0303397 A1* | 11/2012 | Prosser .................. | B60L 53/00 |
| | | | 705/7.12 |
| 2016/0368390 A1* | 12/2016 | Yang ..................... | B60L 11/1818 |
| 2017/0136894 A1* | 5/2017 | Ricci ..................... | B60L 53/126 |
| 2019/0275894 A1* | 9/2019 | Amacker ............... | G06Q 20/3674 |

* cited by examiner

*Primary Examiner* — Richard V Muralidar
(74) *Attorney, Agent, or Firm* — Viering, Jentschura & Partner mbB

(57) ABSTRACT

Herein is disclosed a vehicle-to-vehicle charge transfer system, comprising a charging cable, configured to connect a first electric vehicle to a second electric vehicle; and a donation control unit, configured to receive one or more vehicle charge transfer parameters from the second vehicle; and transfer an electric charge from the first electric vehicle to the second electric vehicle along the charging cable according to the one or more received vehicle charge transfer parameters.

20 Claims, 9 Drawing Sheets

|     | Exposed Parameter | Donor | Recipient |
|---|---|---|---|
| 508 | Maximal Supported Voltage | Share | Share |
| 510 | Maximal Supported Currency | Share | Share |
| 512 | Charge Available for Sharing | Share | |
| 514 | Charge Required | | Share |
| 516 | Connector Type | Share | Share |

500

600

US 11,077,763 B2

INTER ELECTRIC VEHICLE CHARGE TRANSFER

TECHNICAL FIELD

Various aspects of the disclosure relate generally to the transfer of an electrical charge from a first electric vehicle to a second electric vehicle.

BACKGROUND

The lack of a widespread electric vehicle-charging infrastructure is a key limiting factor in the growth and widespread adoption of electric vehicles. An electric vehicle that nears the end of its battery charge while traveling may have no options for recharging the battery before becoming inoperable. In the event that a charging station is available, the station may be inconveniently located.

SUMMARY

Herein is disclosed a vehicle-to-vehicle charge transfer system, comprising a charging cable, configured to connect a first electric vehicle to a second electric vehicle; and a donation control unit, configured to receive one or more vehicle charge transfer parameters from the second vehicle, and transfer an electric charge from the first electric vehicle to the second electric vehicle along the charging cable according to the one or more received vehicle charge transfer parameters.

BRIEF DESCRIPTION OF THE DRAWINGS

Throughout the drawings, it should be noted that like reference numbers are used to depict the same or similar elements, features, and structures. The drawings are not necessarily to scale, emphasis instead generally being placed upon illustrating aspects of the disclosure. In the following description, some aspects of the disclosure are described with reference to the following drawings, in which.

DESCRIPTION

Figure 1:
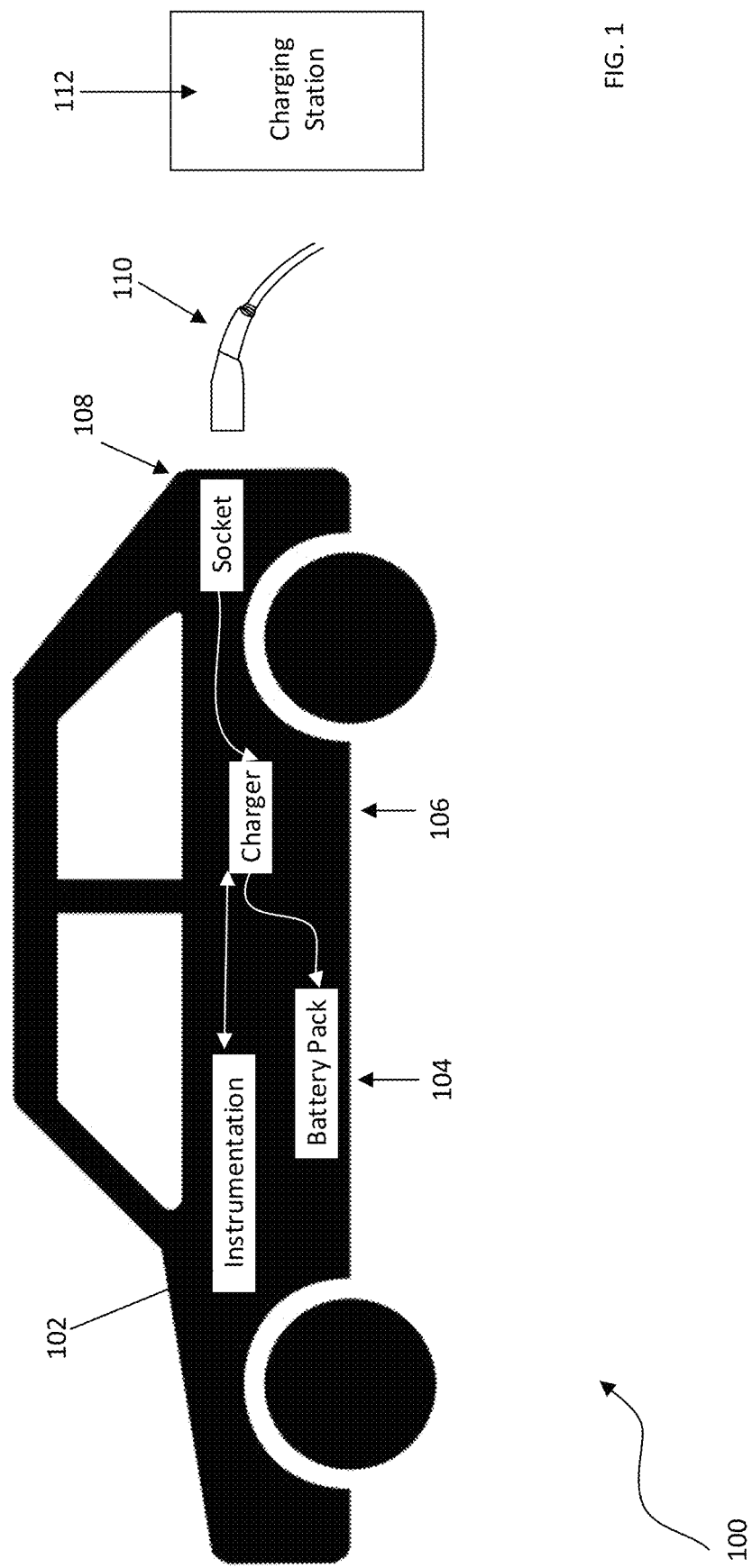
FIG. 1 shows a conventional configuration of an electric vehicle being charged at a charging station.

The following detailed description refers to the accompanying drawings that show, by way of illustration, specific details and aspects in which the disclosure may be practiced. These aspects are described in sufficient detail to enable those skilled in the art to practice the disclosure. Other aspects may be utilized and structural, logical, and electrical changes may be made without departing from the scope of the disclosure. The various aspects are not necessarily mutually exclusive, as some aspects can be combined with one or more other aspects to form new aspects. Various aspects are described in connection with methods and various aspects are described in connection with devices. However, it may be understood that aspects described in connection with methods may similarly apply to the devices, and vice versa.

The word "exemplary" is used herein to mean "serving as an example, instance, or illustration." Any aspect of the disclosure described herein as "exemplary" is not necessarily to be construed as preferred or advantageous over other aspects of the disclosure.

Throughout the drawings, it should be noted that like reference numbers are used to depict the same or similar elements, features, and structures.

The terms "at least one" and "one or more" may be understood to include a numerical quantity greater than or equal to one (e.g., one, two, three, four, [ . . . ], etc.). The term "a plurality" may be understood to include a numerical quantity greater than or equal to two (e.g., two, three, four, five, [ . . . ], etc.).

The phrase "at least one of" with regard to a group of elements may be used herein to mean at least one element from the group consisting of the elements. For example, the phrase "at least one of" with regard to a group of elements may be used herein to mean a selection of: one of the listed elements, a plurality of one of the listed elements, a plurality of individual listed elements, or a plurality of a multiple of listed elements.

The words "plural" and "multiple" in the description and the claims expressly refer to a quantity greater than one. Accordingly, any phrases explicitly invoking the aforementioned words (e.g. "a plurality of [objects]", "multiple [objects]") referring to a quantity of objects expressly refers more than one of the said objects. The terms "group (of)", "set [of]", "collection (of)", "series (of)", "sequence (of)", "grouping (of)", etc., and the like in the description and in the claims, if any, refer to a quantity equal to or greater than one, i.e. one or more. The terms "proper subset", "reduced subset", and "lesser subset" refer to a subset of a set that is not equal to the set, i.e. a subset of a set that contains less elements than the set.

The term "data" as used herein may be understood to include information in any suitable analog or digital form, e.g., provided as a file, a portion of a file, a set of files, a signal or stream, a portion of a signal or stream, a set of signals or streams, and the like. Further, the term "data" may also be used to mean a reference to information, e.g., in form of a pointer. The term data, however, is not limited to the aforementioned examples and may take various forms and represent any information as understood in the art.

The term "processor" or "controller" as, for example, used herein may be understood as any kind of entity that allows handling data, signals, etc. The data, signals, etc. may be handled according to one or more specific functions executed by the processor or controller.

A processor or a controller may thus be or include an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Any other kind of implementation of the respective functions, which will be described below in further detail, may also be understood as a processor, controller, or logic circuit. It is understood that any two (or more) of the processors, controllers, or logic circuits detailed herein may be realized as a single entity with equivalent functionality or the like, and conversely that any single processor, controller, or logic circuit detailed herein may be realized as two (or more) separate entities with equivalent functionality or the like.

The term "system" (e.g., a drive system, a position detection system, etc.) detailed herein may be understood as a set of interacting elements, the elements may be, by way of example and not of limitation, one or more mechanical components, one or more electrical components, one or more instructions (e.g., encoded in storage media), one or more controllers, etc.

A "circuit" as user herein is understood as any kind of logic-implementing entity, which may include special-purpose hardware or a processor executing software. A circuit may thus be an analog circuit, digital circuit, mixed-signal circuit, logic circuit, processor, microprocessor, Central Processing Unit ("CPU"), Graphics Processing Unit ("GPU"), Digital Signal Processor ("DSP"), Field Programmable Gate Array ("FPGA"), integrated circuit, Application Specific Integrated Circuit ("ASIC"), etc., or any combination thereof. Any other kind of implementation of the respective functions which will be described below in further detail may also be understood as a "circuit." It is understood that any two (or more) of the circuits detailed herein may be realized as a single circuit with substantially equivalent functionality, and conversely that any single circuit detailed herein may be realized as two (or more) separate circuits with substantially equivalent functionality. Additionally, references to a "circuit" may refer to two or more circuits that collectively form a single circuit.

As used herein, "memory" may be understood as a non-transitory computer-readable medium in which data or information can be stored for retrieval. References to "memory" included herein may thus be understood as referring to volatile or non-volatile memory, including random access memory ("RAM"), read-only memory ("ROM"), flash memory, solid-state storage, magnetic tape, hard disk drive, optical drive, etc., or any combination thereof. Furthermore, it is appreciated that registers, shift registers, processor registers, data buffers, etc., are also embraced herein by the term memory. It is appreciated that a single component referred to as "memory" or "a memory" may be composed of more than one different type of memory, and thus may refer to a collective component including one or more types of memory. It is readily understood that any single memory component may be separated into multiple collectively equivalent memory components, and vice versa. Furthermore, while memory may be depicted as separate from one or more other components (such as in the drawings), it is understood that memory may be integrated within another component, such as on a common integrated chip.

The terms "donation," "donator," and "donating vehicle" are used to describe the action or the vehicle that transfers an electric charge to another vehicle. The root term "donate" is used in this context to more clearly specify the relationship between the two vehicles. Although "donate" is sometimes associated with an act of charity, it is anticipated that the donator or the donating vehicle may, if desired, solicit and/or receive monetary remuneration for delivering a charge to the receiving vehicle.

The term "electric vehicle" as used herein refers to a vehicle that uses one or more electric motors for propulsion, said one or more electric motors relying at least in part on electric current from a battery.

Due to a lack of widespread charging infrastructure, electric vehicle operators may be limited in traveling distances, based on the availability of charging stations. When an electric vehicle is traveling and nears depletion of its battery resources, the electric vehicle may be unable to reach a charging station before complete loss of battery charge and vehicle inoperability. In the event that a charging station is available, the charging station may be inconveniently located, or may require the electric vehicle to travel in an inconvenient direction, such as requiring backtracking. Given these challenges, it may be desirable to obtain a battery charge without needing to travel to a charging station.

To ameliorate these challenges, an electric vehicle may be configured to donate a charge to, or receive a charge from, another electric vehicle, much the way that a driver may offer a stranded vehicle a portion of gasoline from the vehicle's tank. Such a donation operation may be performed at a location of an inoperable receiving vehicle and is therefore more widely available than a fixed charging station. For example, the charging operation may be performed at any location, such as at a gas station, at a rest stop, in a parking lot, or on the side of the road. The vehicles may be configured to perform the charging in exchange for payment, such that the charge-receiving vehicle negotiates a payment with the charge-donating vehicle, and the payment may be agreed to and/or exchanged at the time of charge donation.

Current car chargers are configured to charge the vehicle's internal battery from an external source of electrical power, such as a charging station. Given the current configurations, it is generally impossible to charge an electric vehicle by connecting it to another electrical vehicle. The system and methods described herein enable vehicle-to-vehicle charging without the necessity of an external charging station. According to one aspect of the disclosure, the system described herein may be integrated into an existing electric vehicle powertrain system to enable transfer of an electrical charge from the vehicle's internal operational battery to the recipient vehicle's battery. According to another aspect of the disclosure, this electrical charge transfer occurs with establish security and commercial models to support power exchange.

FIG. 1 shows a conventional configuration of an electric vehicle being charged at a charging station 100. In this figure, the electric vehicle is equipped with an instrumentation unit 102, a battery pack 104 a charger 106, and a charging socket 108. The charging socket is configured to receive a charging cable 110 for charging of the battery. The charging cable 110 is further configured to be connected to a charging station 112. The charging stations 112 are typically fixed stations connected to a mains power line, and comprising various processors to deliver an electric charge to an electric vehicle. The charging stations 112, being fixed entities, function largely analogously to a gas pump, such that they are immovable, to which a vehicle drives to receive "fuel" for future traveling.

Figure 2:
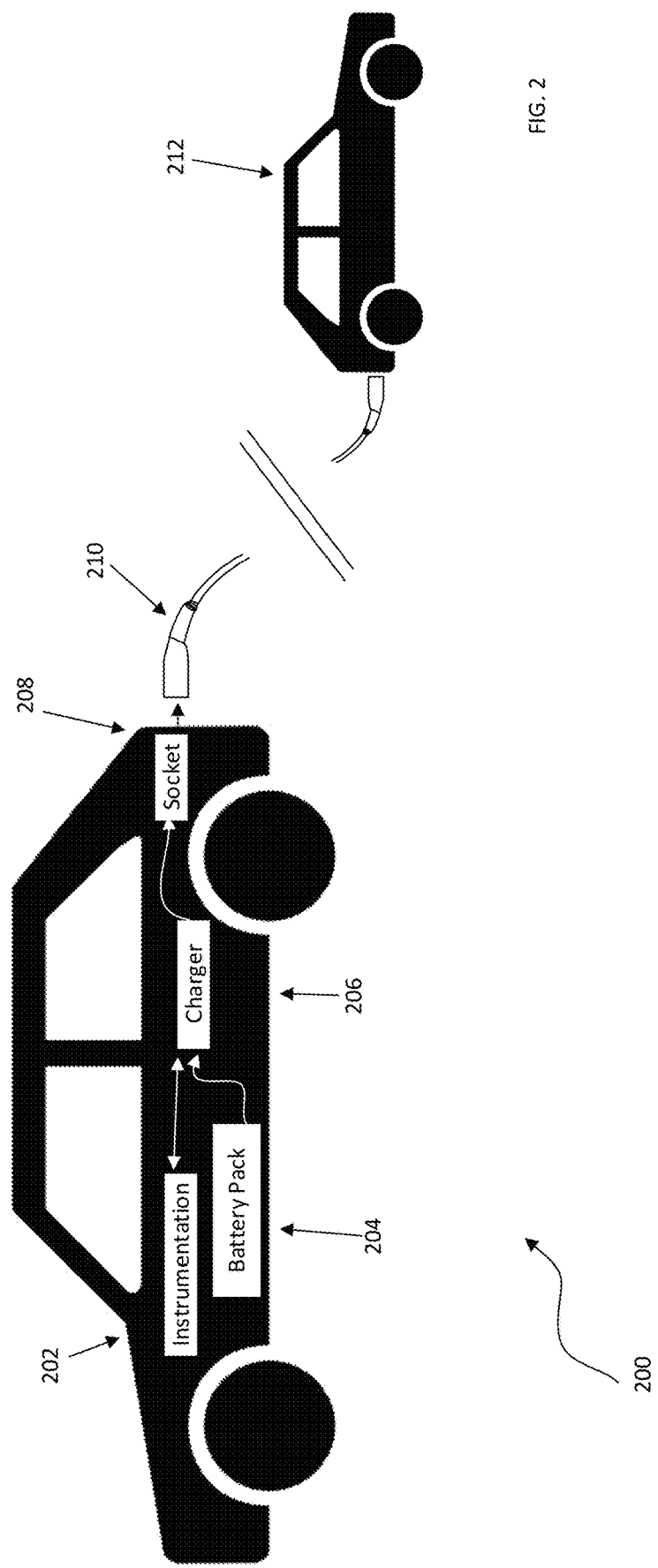
FIG. 2 shows an electric vehicle receiving a charge from a second electric vehicle pursuant to an aspect of the disclosure.

FIG. 2 shows a donor vehicle 200 donating a charge to a receiving electric vehicle 212 pursuant to an aspect of the disclosure. In this figure, the donor vehicle 200 is equipped with an instrumentation unit 202, a battery pack 204, a charger unit 206, and a socket 208. The socket is configured to receive a charging cable 210. The charging cable 210 comprises two ends, which are configured to be connected to a vehicle. The ends of the charging cable may comprise a male connector, a female connector, or otherwise. The charging cable 210 may be equipped with one or more adapters, configured to connect the charging cable 210 to the sockets 208 of two or more vehicles. As depicted in FIG. 2, the charging cable 210 is configured to connect to the socket 208 of the donor vehicle 200 and to the socket of the receiving vehicle 212. The receiving vehicle 212 may comprise any element or elements depicted with respect to the donating vehicle, including, but not limited to, an instrumentation unit, a battery pack, a charger, and a socket. The instrumentation unit may comprise a donor control unit.

Figure 3:
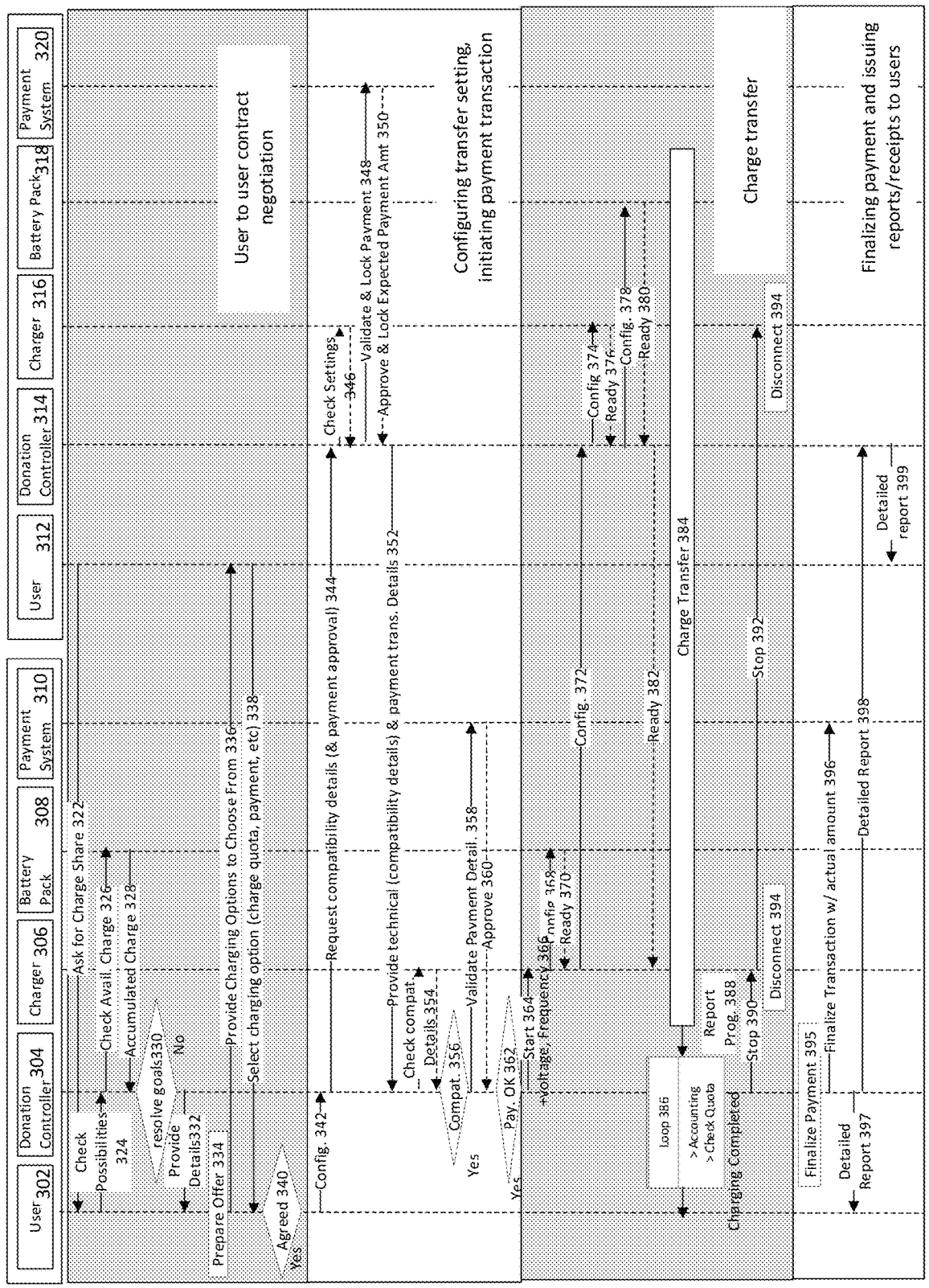
FIG. 3 shows a communication schematic for negotiation and approval of a vehicle-to-vehicle charge, according to an aspect of the disclosure.

FIG. 3 shows a communication schematic for negotiation and approval of a vehicle-to-vehicle charge, according to an aspect of the disclosure. The donor elements are depicted as user 302, donation control unit 304, charger 306, battery pack 308, and payment system 310. The donation controller (also referred to as donation control unit) 304 may be located anywhere within the donor vehicle. According to one aspect of the disclosure, the donation control unit may be located within the donor vehicle dashboard. The donor vehicle dashboard may be modified to accommodate a donation control unit. The recipient elements are depicted as user 312, donation controller 314, charger 316, battery pack 318, and payment system 320. The following communication schematic depicts a sample communication between the donor vehicle and recipient vehicle. The communication exchanges proposed herein are intended to model a communication exchange; however, it is expressly understood that a variety of communication protocols are possible, and communication schematic disclosed herein is not intended to be limiting.

In this case, a user of a recipient vehicle 312 may request a charge share 322 from a user of a donor vehicle 302. The user of the donor vehicle 302 may communicate with the donation control unit 304 to inquire as to possibilities for a charge 324. Factors in determining such possibilities may include available charge of the donor vehicle, anticipated distance of donor vehicle remaining before next charge, relationship of donor vehicle to available charging stations, or otherwise. Where it is decided that a donation is possible, the donation control unit 304 may check with the battery pack 308 to determine an available charge 326. The battery pack 308 transmits an available charge 328 to the donation control unit 304. Based on this information, the donation control unit 304 may decide whether a charge is possible based on a resolution of various goals 334 the donor vehicle, such as resolving the impact of decreased charge on intended driving distance or available time for charge. The donation control unit 304 provides the above details 332 to the user 302. The user may then decide to prepare an offer 334 for the charge to the recipient vehicle. Should an offer be made, the user 302 may provide one or more charging options 336 to the recipient vehicle 312. The recipient vehicle 312 may select one or more charging options 308 and communicate said selection to the donor vehicle 302. Said charging options may include, but are not limited to a charge quota, a payment for the charge, or otherwise. Where the parties agree 340 on the charging options and/or parameters for the charge, the charge may be carried out. Agreement pursuant to 340 should be understood to include a donor approval. Donor approval may be useful in preventing charge siphoning, theft, or otherwise, and therefore one or more methods may be available to indicate or confirm a donor approval. Said methods for confirming donor approval include, but are not limited to, entry of a personal identification number or password, fingerprint, approval via key, approval via mobile phone, or any other approval method without limitation.

Where the charge is agreed to, the donor vehicle user 302 may instruct the donation controller 304 to configure the charge parameters 342. The donation controller 304 may communicate a request for compatibility details and/or payment approval 344 to the donation controller unit for the donator vehicle 314. The donation control unit 314 may request that its charger 316 check its available settings, and the charger 316 may communicate the available settings 346 to the donation controller 314. The donation controller 314 may validate and lock payment 348 with the payment system 320. The payment system 320 may approve and lock the expected payment amount 350 and communicate said approval and lock to the donation controller 314. The recipient donation controller 314 may provide technical, compatibility and/or payment transactional details 352 to the donor donation controller 304. The donation controller 304 may check compatibility details 354 with the charger 306, and the charger 306 may provide a confirmation of compatibility details to the donation controller 304. The donation controller may then decide whether the vehicles are compatible 356. Where the vehicles are determined to be compatible, the donation controller 304 may validate payment details 358 with the donation payment system 310. Where the donation payment system 310 approves the payment details 360, this approval is then transmitted to the donation controller 304. Where the donation controller 304 determines that payment is acceptable 362, the donation controller 304 may authorize a start 364 of the donation and may transmit a desired voltage, frequency, or otherwise 366 to the charger 306. The charger 306 configures the donation parameters 368 with the battery pack 308. The battery pack, upon processing the donation parameters informs the charger 306 that it is ready for charge 370. The charger 306 may configure the charge 372 with the donation controller of the recipient vehicle 314. The donation controller of the recipient vehicle 314 may communicate with its charger 316 to configure for receipt of a charge. Where the charger 316 confirms its readiness 376 for the charge, this is then communicated to the donation controller 314. The donation controller transmits configuration settings 378 to the battery pack 318, which then upon processing the said settings confirms its readiness 382 the donation controller 314. The donation controller 314 transmits a readiness for the charge 328 to the charger of the donor vehicle 306. At this point, a charge transfer takes place 384. During such time as the charge transfer 384 takes place, and an ongoing looped evaluation is performed within the donor vehicle 386 such that the charge is assessed for accounting details and quota to determine the proper amount of charge relative to the payment as dispensed. Any unit of the donor vehicle including, but not limited to, the donation controller 304, the charger 306, the battery pack 308, the payment system 310 may transmit a progress report 388 of the charge transfer 384. Upon the charging being completed, the donation controller transmits a stop command 392 the charger 306. The charger 306 is disconnected from the charger 316, and the transfer is stopped 392. The devices are disconnected 394.

The charge having been completed, the payment is then finalized 395. The donation controller 304 transmits a finalized transaction with an actual payment amount 396 to the payment system 310. The donation controller 304 issues a detailed report 397 to the user 302. The donation controller 304 issues an additional detailed report 398 to the recipient donation controller 314, which in turn provides a detailed report 399 to the recipient user 312. Notwithstanding the above procedure for when the electric charge distribution occurs in exchange for a payment, the electric charge distribution may be performed gratuitously or without remuneration, or with an offline payment. Where electric charge distribution is performed without requiring formalized payment between the vehicles, the charge distribution will be performed without the donation controller 304 communicating with a payment infrastructure. This method may be used where the charging services are performed gratuitously, or where offline payment is agreed upon, such as a direct payment between vehicle operators, payment in cash, barter, or other exchange.

Figure 4:
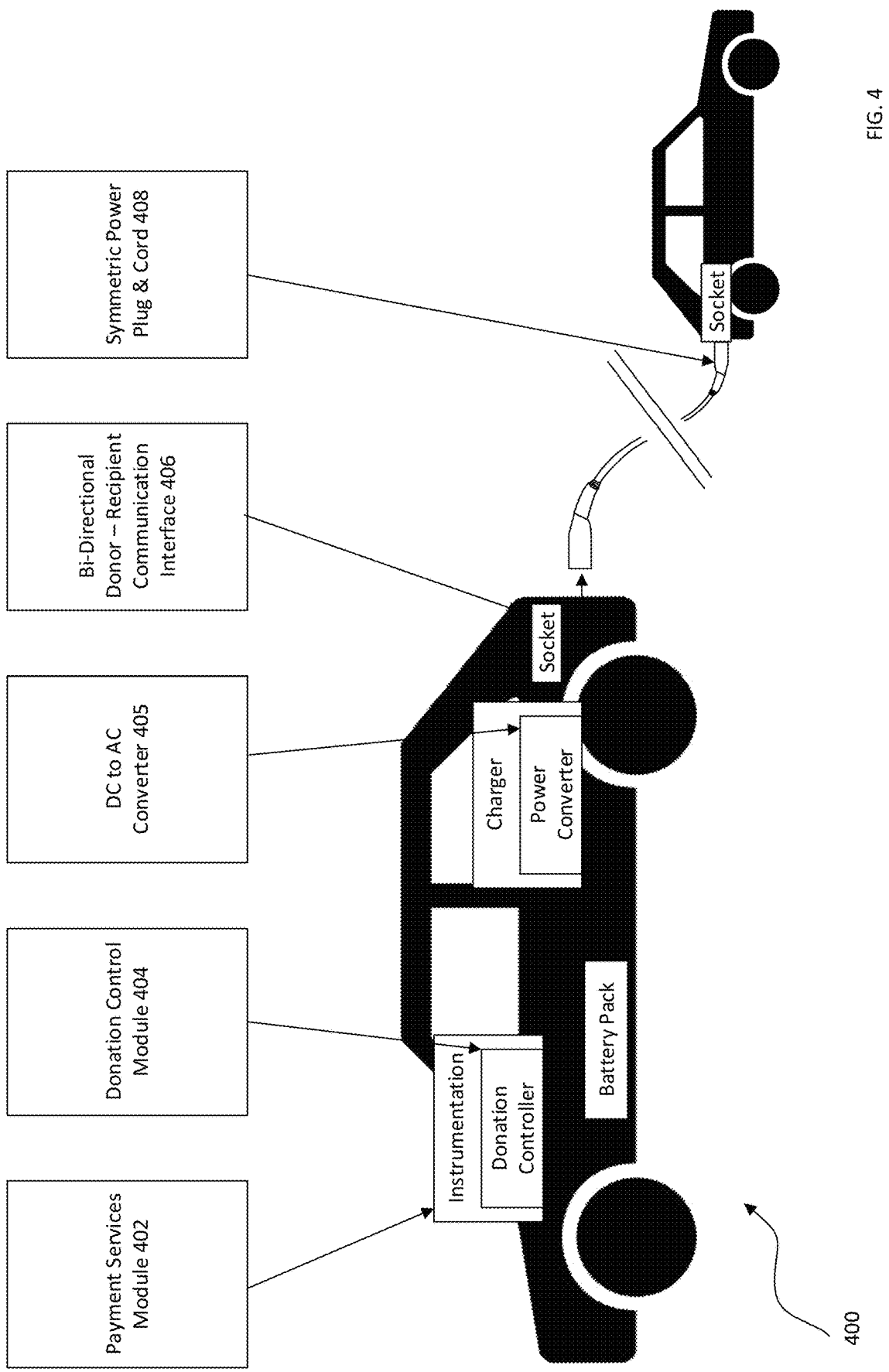
FIG. 4 shows various elements within electric vehicle receiving a charge according to an aspect of the disclosure.

FIG. 4 shows various elements within electric vehicle receiving a charge according to an aspect of the disclosure. The instrumentation unit 202 may comprise a payment services unit 402 and/or a donation control unit 404. The donation control unit 404 may be configured to manage user interactions, orchestrate charging flow, manage security communication, and perform accounting and charging operations. The charger unit 206 may comprise a DC to AC converter 405. The socket 208 may be configured as a bidirectional donor/recipient communication interface 406. The charging cable 210 may be configured as a symmetric power plug and cord 408.

The payment services unit 402 may be configured to negotiate and perform a payment transaction for charge donation. The payment services unit may be configured to interact with a corresponding unit on the donator vehicle to arrive at a cost for the charge donation. The cost may be agreed upon by persons operating the donator vehicle and recipient vehicle, or may be negotiated between the payment services units based on one or more predetermined values. The payment services unit may be configured to perform one or more algorithms to negotiate a price.

The donation control unit 404 negotiates transfer of a charge from the donor vehicle to the recipient vehicle. As will be discussed infra, this may require negotiation of current, voltage, charge duration, and/or whether the charge should be delivered in direct current or alternating current. The donation control unit 3 or 4 may perform one or more donation control protocols to prepare for charge donation and/or to prepare the receiving vehicle for charge receipt.

The DC to AC converter 405 may be used where the receiving vehicle requests receipt of a charge as an AC current. There being no universal standard for vehicle charges between vehicle makes and models, some electric vehicles may be configured to receive an electric charge as an alternating current, whereas other electric vehicles are configured to receive a charge as a direct current. Because the electrical vehicle's battery provides a direct current, a donator vehicle may be configured to change the current from direct current to alternating current, in order for the charge to be receivable by the receiving vehicle.

The socket may be configured as a bidirectional donor recipient communication interface 406. This interface may provide input/output communication capability between two or more electric vehicles. As will be described infra, the vehicles may be configured to perform a variety of communication protocols, which negotiate aspects of the charge donation and prepare the receiving vehicle for charge receipt. Such negotiations may be performed via the sockets configured as a communication interface, which are hard-connected by the plug and cord.

These symmetric power plug and cord 408 may comprise two ends, each and having a plug unit which is configured to be connected directly to an electric vehicle. Conventional electric vehicle cords contain a charging nozzle (a plug) configured to connect to an electric vehicle and a charging nozzle configured to connect to a charging station. Very often, the charging nozzles for an electric vehicle and for a charging station are differently configured and mutually incompatible. That is, the cord has a unidirectional configuration, such that only one charging nozzle can be inserted to the vehicle and only one charging nozzle can be inserted into the charging station. These symmetric power plug and cord 408 as described herein may be configured with plugs such that one end of the cord may be connected to an electric vehicle and the other end of the cord may be connected to a different electric vehicle. The plugs may be arranged in any configuration whatsoever that is capable of transferring an electric charge from one vehicle to another and, where so required, performing any necessary communication between vehicles. Current plug configurations are widely nonstandardized and may be mutually incompatible between vehicle manufacturers or models. In order to increase compatibility, the symmetric power plug and cord 408 may be configured with one or more adapters to render a plug configuration compatible with a desired vehicle manufacturer or model.

Figures 5, 6:
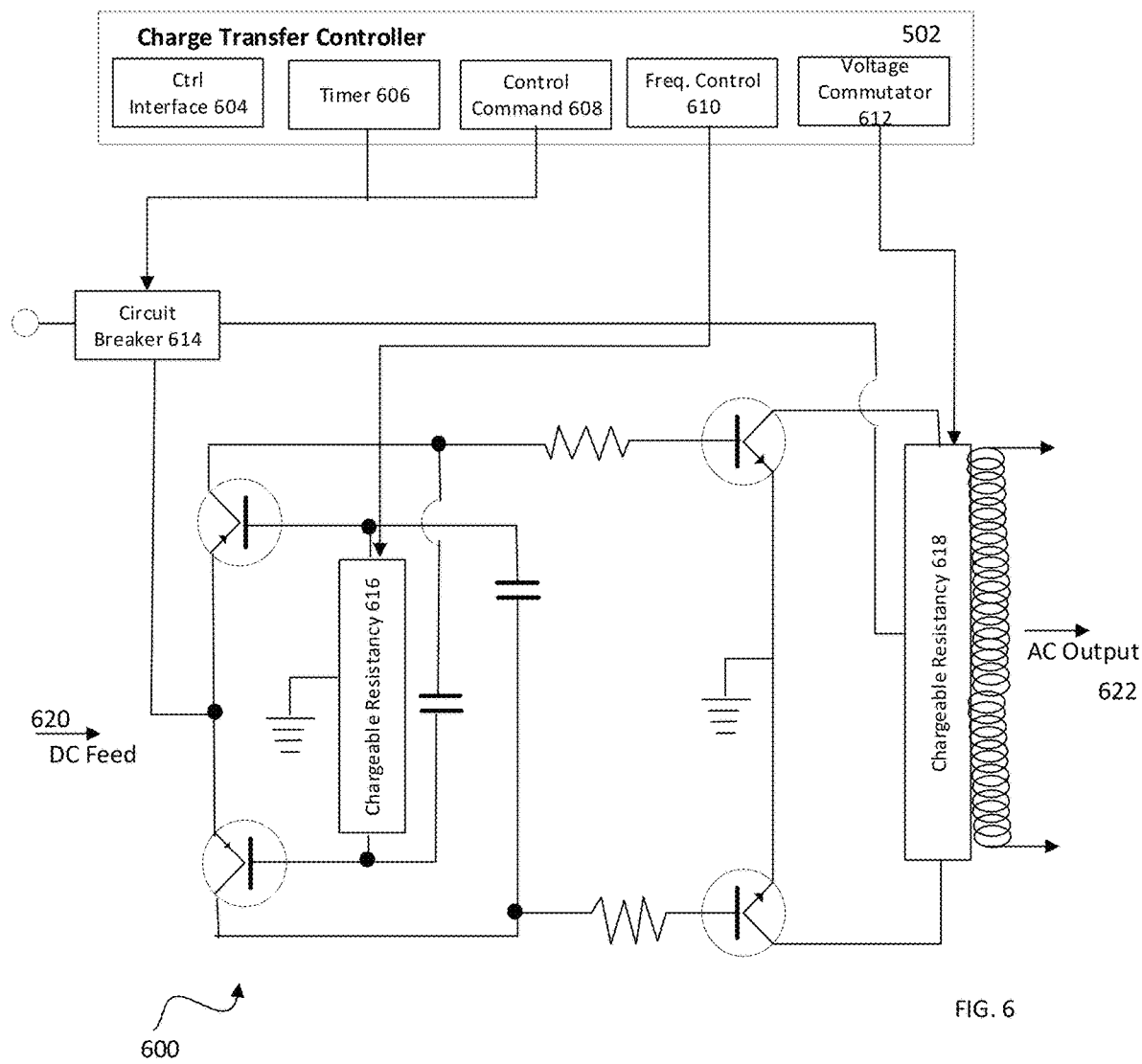
FIG. 5 shows a communications protocol for shared information between a donor vehicle and a recipient vehicle.
FIG. 6 shows a charge transfer controller, according to an aspect of the disclosure.

FIG. 5 shows a communications protocol 500 depicting various parameters 502 for shared information between a donor vehicle 504 and a recipient vehicle 506. Said parameters include maximal supported voltage 508, maximal supported currency 510, charge available for sharing 512, charge required 514, and connector type 516. The maximal supported voltage 508 is shared by both the donor and recipient vehicle. The maximal supported currency 510 is shared by both the donor and recipient vehicle. The charge available for sharing 512 is shared only by the donor vehicle. The charge required is shared only by the recipient vehicle. The connector type is shared by both the donor and recipient vehicle.

FIG. 6 shows a charge transfer controller 600, according to an aspect of the disclosure. The donation control unit 600 may be configured as a unit 602, containing one or more circuits or processors. The one or more circuits or processors may be configured as a control interface 604, a timer 606, a control command 608, a frequency control 610 and/or a voltage communicator 612. The control interface 604 may be configured to accept commands received from instrumentation and translate them for internal processing; the control interface 604 may additionally be configured to operate the charge transfer controller in accordance with the parameters negotiated and agreed upon by the donor vehicle in the recipient vehicle. The timer 606 may be configured to time a charge donation, to close a circuit for charge initiation, and to break a circuit after the charge time has been met. This may occur, for example, in instances where a duration of charge is negotiated. The control command 608 may operate one or more circuits within the charge transfer controller, such as opening or closing a circuit breaker, initiating or stopping a charge, or otherwise. The frequency control 610 may be configured to modify a charge frequency or a chargeable resistance the 616. The voltage communicator 612 may be configured to operate a chargeable resistance 618 for distribution of voltage to a recipient vehicle. The charge transfer controller may be equipped with a circuit breaker 614, which may be configured with on and off positions, to enable or disable flow of current from the donor vehicle to the recipient vehicle. The charge transfer controller may be connected with one or more circuits capable of converting a direct current to an alternating current. This may be used, for example, in circumstances where the recipient vehicle is configured to receive an alternating current charge. The conversion from direct current to alternating current may be operated and controlled by the charge transfer controller. The circuit may be configured to receive a direct current input 620 and to convert said direct current into alternating current, where it is output 622 to the receiving vehicle.

Figure 7:
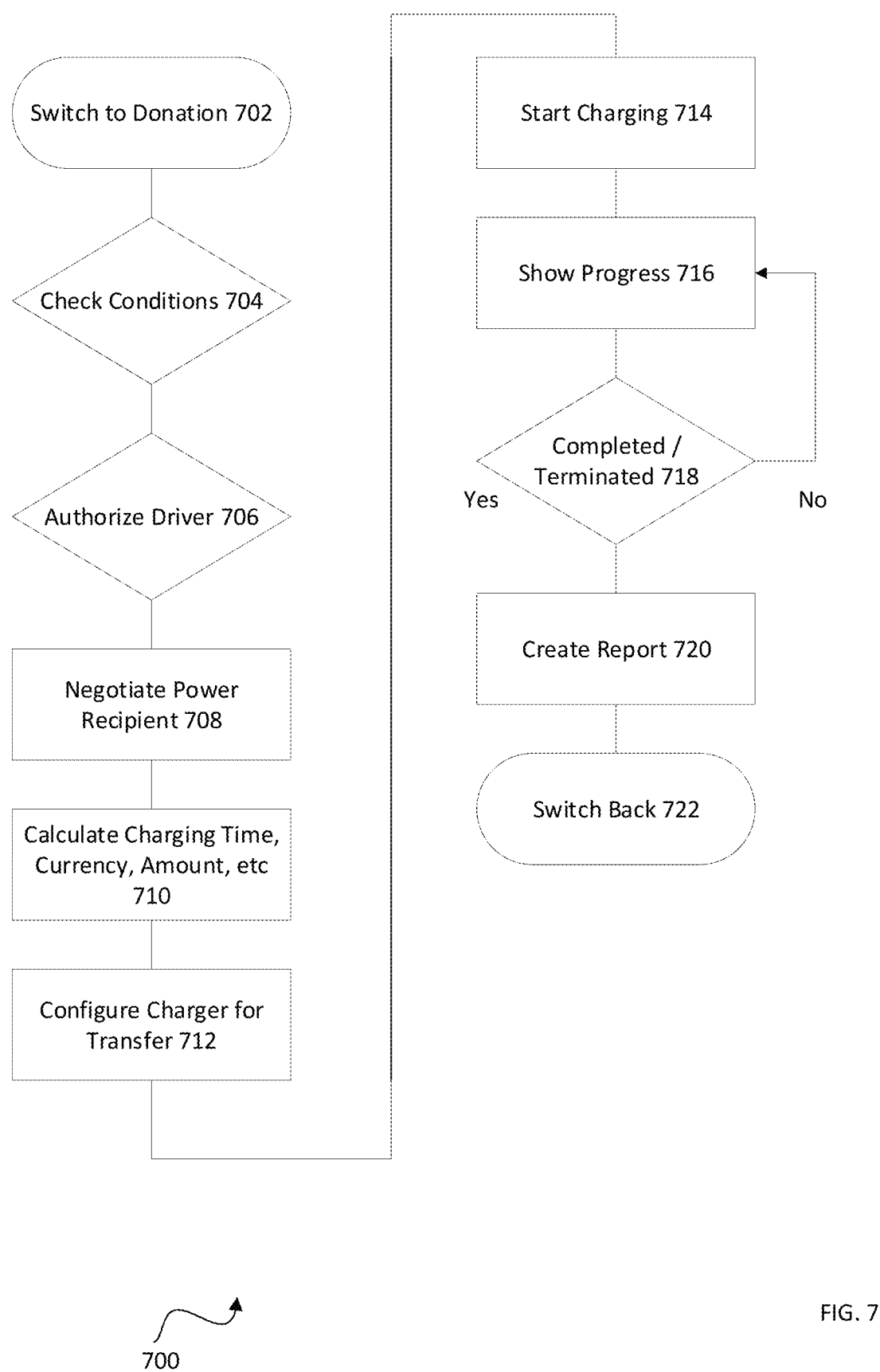
FIG. 7 shows a flowchart for vehicle-to-vehicle charging, according to an aspect of the disclosure.

FIG. 7 shows a flowchart for vehicle-to-vehicle charging 700, according to an aspect of the disclosure. According to this flowchart, the donating vehicle may switch to donation mode 702 in preparation for a donation to a recipient vehicle. Donation conditions 704 are checked, such as whether sufficient charge remains within the donor vehicle, a distance to a charging station for the donor vehicle, and intended distance of remaining driving before charge for the donor vehicle, available time for the donor vehicle, or otherwise. Upon evaluating the conditions 704, the donor vehicle driver may authorize a donation 706. The donor vehicle and the recipient vehicle negotiate power requirements 708 to determine the technical ability to transmit a charge from the donor vehicle to the recipient vehicle. Assuming that a charge is possible, the charging time, payment amounts, current, voltage, or otherwise are calculated 710. Upon agreement of the various charging configurations, the charger is configured for charge transfer 712. The charging is begun 714, and throughout the charging process, a loop is performed to evaluate the progress of the charge. This progress is displayed to one or more of the donor vehicle operator and the recipient vehicle operator 716. Upon completion of the charge, the connection between the vehicles is terminated 718. A completed charge report 720 is created which may show any of the current transmitted, voltage transmitted, frequency, duration, agreed price, price paid, etc. Upon completion and issuance of the report, the vehicle is returned from the donation mode to a regular operation mode 722.

Figure 8:
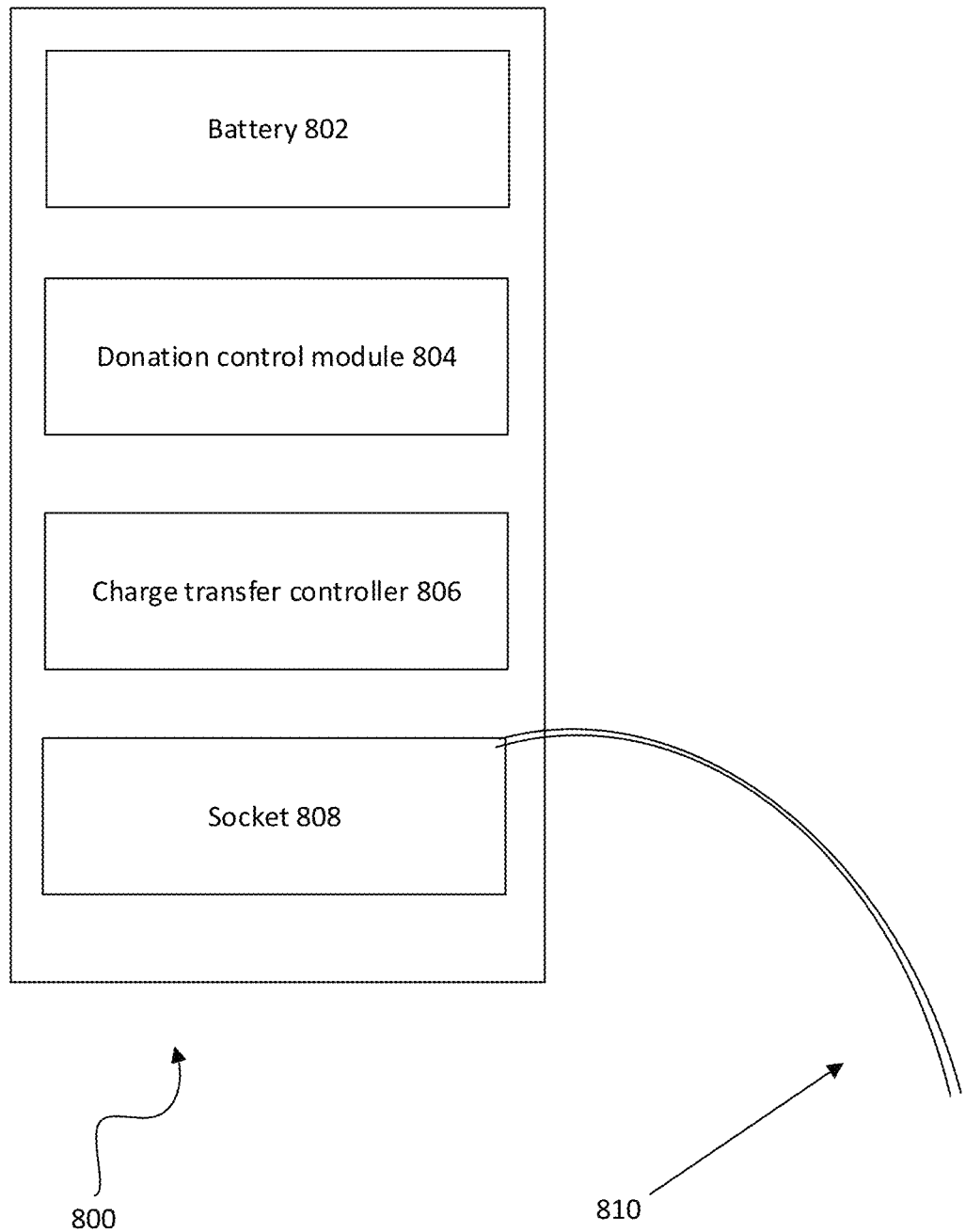
FIG. 8 shows a vehicle-to-vehicle charge transfer system according to one aspect of the disclosure.

FIG. 8 shows the vehicle-to-vehicle charge system according to one aspect of the disclosure. The vehicle-to-vehicle charge system 800 disclosed herein may comprise a battery 802, configured to store an electric charge; a donation control unit 804 configured to receive one or more recipient vehicle charge transfer parameters and to transfer an electric charge from the donor vehicle to the recipient vehicle according to the one or more recipient vehicle charge transfer parameters; and a socket 808, configured to receive a charging connection cable 810 between the donor vehicle and the recipient vehicle. The donor vehicle may further comprise a charge transfer controller 806, configured to enable and disable a flow of current from the donor vehicle to the recipient vehicle and, as corresponds to the configurations of the donor vehicle and the recipient vehicle, to convert a direct current from the donor vehicle into an alternating current for receipt by the recipient vehicle. The charge transfer controller 806 may be an independent circuit or may be incorporated within the donation control unit 804.

The charge transfer controller 806 may be configured as a power conformity unit, which may receive the electric charge from the battery and adapt the electric charge to satisfy the one or more recipient vehicle charge parameters. Conventional electric vehicles operate according to a variety of standards, details of which may be specified or determined by each individual manufacturer. As such, electric vehicles may operate according to different current values, different voltages, different frequencies, or otherwise. As such, and electrical impulse from a given donor vehicle, without modification, may be unsuitable for charging a recipient vehicle. Thus, an electric charge from the donor vehicle may require modification, such as increase or decrease in voltage, increase or decrease in current, increase or decrease in frequency, or conversion between direct current and alternating current, in order to be acceptable as a charge for the recipient vehicle. It is anticipated that the donor vehicle and recipient vehicle may communicate their required configurations in order to determine the necessary modifications to appropriately deliver a charge from the donor vehicle to the recipient vehicle.

Figure 9:
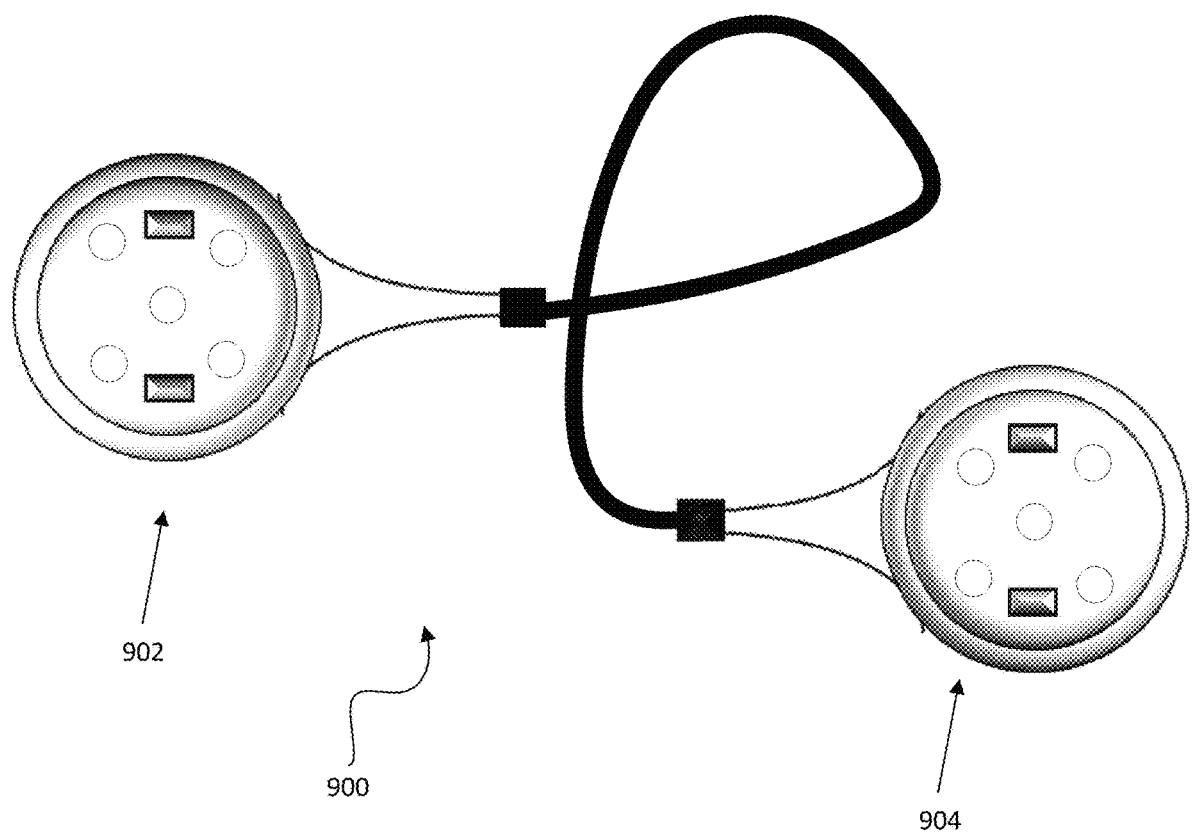
FIG. 9 shows a charging cable configuration according to one aspect of the disclosure.

FIG. 9 shows a configuration of the vehicle-to-vehicle charging cable 900, according to one aspect of the disclosure. The charging cable 900 is configured with two charging nozzles 902 and 904. Unlike a conventional charging cable, which may be configured with opposing or oppositely configured nozzles to facilitate a specific directional connection between the vehicle and the charging station, the charging cable may be configured with identical or similarly situated nozzles to allow for connection to two vehicles. According to one aspect of the disclosure, the charging cable may be configured with two male nozzles, two female nozzles, or otherwise. The nozzles may be identical. According to another aspect of the disclosure, one nozzle may be configured for the socket of the specific vehicle to which it corresponds, while the other nozzle may be configured to comport with one or more electrical vehicle nozzle standards. The nozzles may be configured according to any standard, whether past, present, or future, regarding the socket or nozzle configuration for an electric vehicle. The charging cable 900 may be a modified version of a standard power cord, whereby both sides of the connecting wire terminate with an output socket that enables vehicles to be connected using their regular input sockets. The power cord may be configured to support vehicle-to-vehicle communication.

It is anticipated that one charging nozzle will be configured to connect with the donor vehicle, and the other charging nozzle will be configured to connect with the recipient vehicle. A charging nozzle belonging to a vehicle may, for instance, include a nozzle that is configured to be compatible with its respective vehicle. In order to maximize charging opportunities, the charging cable may be configured with one or more adapters to convert another and of the charging cable to be compatible with an additional vehicle. It is anticipated that the charging cables may be equipped with one or more adapters that match socket configurations for electric vehicles in a region corresponding to the vehicle's use. The charging cable nozzle may be equipped with one or more connecting pins or other connecting regions, to connect one or more wires within the charging cable to one or more nodes within the socket. Such connection configurations permit not only the delivery of a charge from a donor vehicle to a recipient vehicle, but may also enable communication between vehicles using the charging cable. That is, charging negotiations, such as payment amount, payment transactions, charging configurations, vehicle configurations, vehicle requirements, and otherwise may be communicated between vehicles using the charging cable.

Figure 10:
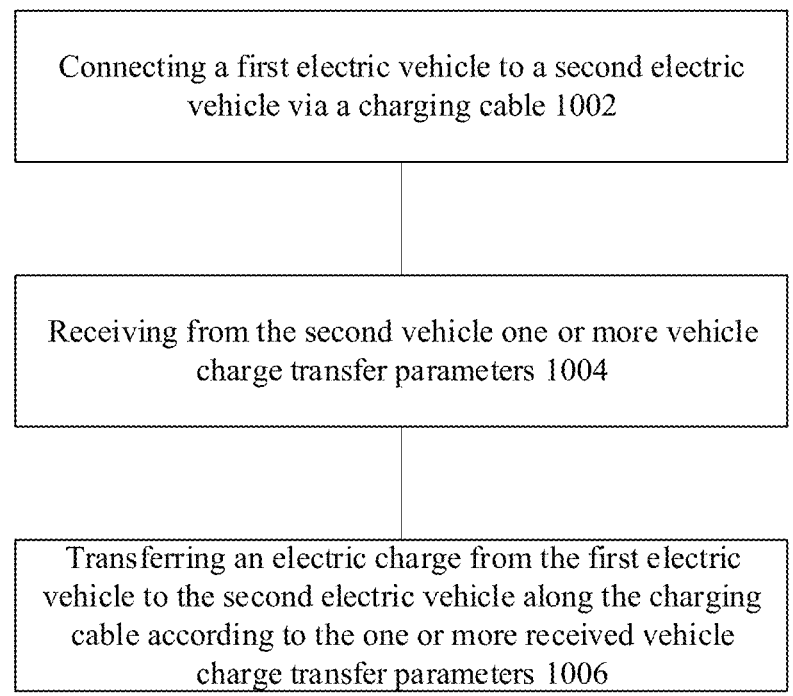
FIG. 10 shows a method of vehicle-to-vehicle electric charge transfer.

FIG. 10 shows a method of vehicle-to-vehicle electric charge transfer comprising connecting a first electric vehicle to a second electric vehicle via a charging cable; receiving from the second vehicle one or more vehicle charge transfer parameters; and transferring an electric charge from the first electric vehicle to the second electric vehicle along the charging cable according to the one or more received vehicle charge transfer parameters.

Conventional charging cables are configured to connect an electric vehicle to a charging station and are typically configured with two differing nozzles, such that only one nozzle can be connected to the vehicle and only one nozzle can be connected to the charging station. These nozzles may be configured, for example, as a male nozzle and a female nozzle. The charging cable disclosed herein may be configured with two nozzles for vehicle connection, such as a male nozzle and a male nozzle, or a female nozzle and a female nozzle. The charging cable may be configured to emulate an external power source. Depending on the protocols implemented, it the recipient car may be unaware that it is receiving a charge from another vehicle as opposed to a charging station. This permits the vehicle-to-vehicle charging technology to be used with a recipient vehicle that is not specifically configured for this technology.

Alternatively, communications between vehicles related to charging may be performed wirelessly. Said communications may be performed via any wireless protocol including, but not limited to vehicle-to-vehicle communications, Wi-Fi, Bluetooth, radio access technology, or otherwise. The communications may be direct communications between vehicles. The communications may be routed from vehicle-to-vehicle via one or more nodes, such as a base station, a radio access technology station, a hotspot, or otherwise.

The donation control unit may be configured to require a user authorization before transferring an electric charge from the donor vehicle to the recipient vehicle. The user authorization may occur using any identification procedure, such as, but not limited to, a password, an identification card, and identification key, a personal identification number, a two-step verification number, a fingerprint, a retinal scan, or any other bio-identifying marker. Such identification requirement may inhibit or preclude charge theft by requiring the assent and approval of a vehicle owner or person in rightful control of said vehicle.

During communication with the recipient vehicle, the donation control unit of the donor vehicle may be configured to obtain from the recipient vehicle at least one of a recipient vehicle input voltage, a recipient vehicle maximum supported current, a recipient vehicle minimum required capacity, a current frequency, or any of the foregoing. Upon receiving any such information, the donation control unit may configure one or more units within the donor vehicle to modify and outgoing charge to match the charge specifications of the recipient vehicle. Accordingly, the donor vehicle may alter the outgoing voltage, alter the outgoing current, adjust or determine an outgoing charge amount, alter the outgoing frequency, or otherwise to match the specifications of the recipient vehicle. Alteration of the outgoing current or voltage may be achieved with any known means including, but not limited to, one or more variable resistors. Alteration of the outgoing charge amount may occur based on a duration of charge donation or otherwise between switching on and switching off a circuit which allows a flow of electrical charge from the donor vehicle to the recipient vehicle.

The donation control vehicle may be configured to determine a magnitude of electrical charge to be delivered to the recipient vehicle. The magnitude may be a value arrived through negotiation between the donor vehicle and the recipient vehicle. The donation control unit may be further configured with one or more processors to perform said negotiation and to determine a magnitude based on one or more of the following factors: estimated driving distance of the donor vehicle following charge transfer; estimated driving distance of the donor vehicle before next charging station; estimated distance of recipient vehicle before next charging station; distance to next charging station in direction of donor vehicle; distance to next charging station in direction of recipient vehicle; expected charging time of recipient vehicle; expected charging time of donor vehicle; available time of donor vehicle for charging; and available time of recipient vehicle for charging.

The donation control unit may be configured with one or more payment units, which may initiate or perform a monetary transfer from a recipient vehicle to a donor vehicle. The monetary transfer may occur via any means whatsoever and may include, but not be limited to, payment via credit card, debit card, wire transfer, a third party payment service, or a vehicle-specific proprietary payment service. The payment unit may be achieved via any payment service installed on a user mobile device, and said payment unit may be configured to communicate with said mobile device to arrange for a corresponding payment. The payment transfer may be transmitted from vehicle-to-vehicle through the charging cable, in a wireless connection from vehicle-to-vehicle, or in a wireless connection from one vehicle to the other vehicle through one or more stations, routers, or hubs.

According to one aspect of the disclosure, a vehicle-to-vehicle charging mechanism creates new fragmented markets for vehicle-to-vehicle energy transfer by bypassing the larger commercial electricity markets. Such a system may permit energy exchange outside of the public infrastructure, such as permitting private or anonymous vehicle recharging. The methods described herein support monetization of vehicle-to-vehicle energy transfer by providing mechanisms for negotiation of costs, agreement of a payment scheme, and money transfer.

According to another aspect of the disclosure, the vehicle-to-vehicle energy transfer may occur in exchange for a flat rate. That is, rather than a payment scheme per unit of measurement, a flat rate can be agreed upon for the necessary energy transfer. This may be, for example, a flat rate in exchange for restoring the recipient battery to 100% charge.

According to another aspect of the disclosure, payment for vehicle-to-vehicle charging may occur with an alternative currency, voucher, point, or credit system. Payments may occur via any agreed-upon current scene. Payments may occur based on a transfer of points or a creation of new points. Payments may occur based on an alternative currency, crypto currency, or otherwise.

Payments may be arranged in a lump sum at the beginning or end of the charging transaction. Alternatively, payments may be made at multiple times throughout the transaction process. For example, one-half of the payment may be performed at the beginning of the transfer, and one-half may be performed at the end of the transfer. Moreover, several payments may be made throughout the transfer process, such that the cumulative total of payments equals the agreed-upon transaction amount.

According to one aspect of the disclosure, charge donation may be performed according to the following algorithm: (1) during user-to-user contract negotiation, donor and recipient will reach an agreement regarding the charging quota and optional related payment; (2) during authorization and validation of the charging parties, users and cars will be mutually assessed and authenticated to protect from potential thefts, improper connectivity, and falsified payments; (3) during charging, the charging is performed while the users are periodically prompted with charging and/or payment progress, and charging is discontinued with a cut-off switch when charging goals are reached; and (4) during finalizing, the cars are returned to the regular operational mode, while any remaining portions of the payment transaction will be completed and appropriate reports will be issued. Where e-payment is used, the donor car may be selected as the responsible entity for finalizing the payment transaction such that abrupt interruption will not affect the payment control flow. Payment engine of the donor car will provide signatures allowing the recipient's controller to validate the authenticity of the engine and "trust" the payment transaction.

It is contemplated that the capacity to perform a vehicle-to-vehicle charge may permit additional economic solutions such as the providing of emergency or mobile charging as a service.

The system and methods described herein may include a system for charging a vehicle battery by using a battery of a different vehicle as a power source. This may include a control mechanism for protecting against improper charging conditions, charge theft, hacking, or otherwise. This may include a car-to-car negotiation protocol for optimizing charging time while maintaining safety for both vehicles. They may include an operational flow designed for efficient and simple operation. They may include an interface and flow aim to support direct peer-to-peer payment for charge transfer.

According to another aspect of the disclosure, the charging nozzle may be configured in a universal form. Although various vehicles and vehicle manufacturers have a proprietary format that may not be comparable with other vehicles, the charging nozzle may be configured in a universal formal, so as to permit connection with multiple proprietary or unique formats. A universal charging nozzle may utilize more or fewer connection components than a proprietary format, said components being adjustable, shapeable, or retractable to establish a charging connection with a vehicle.

Further, various embodiments will be described in the following.

In Example 1, a vehicle-to-vehicle charge transfer system is disclosed, comprising, a charging cable, configured to connect a first electric vehicle to a second electric vehicle; and a donation control unit, configured to receive one or more vehicle charge transfer parameters from the second vehicle; and transfer an electric charge from the first electric vehicle to the second electric vehicle along the charging cable according to the one or more received vehicle charge transfer parameters.

In Example 2, the vehicle-to-vehicle charge transfer system of Example 1 is disclosed, wherein, the vehicle-to-vehicle charge transfer system further comprises a battery, configured to store an electric charge is disclosed, wherein battery is located within the first vehicle, and wherein the donation control unit is configured to transfer the electric charge from the battery to the second vehicle.

In Example 3, the vehicle-to-vehicle charge transfer system of Example 1 is disclosed, wherein the donation control unit is further configured to adapt the electric charge to satisfy the one or more second vehicle charge parameters.

In Example 4, the vehicle-to-vehicle charge transfer system of Example 3 is disclosed, wherein adapting the electric charge to satisfy the one or more second vehicle charge parameters comprises at least one of converting the electric charge from direct current to alternating current, modifying a voltage, and modifying a charge frequency.

In Example 5, the vehicle-to-vehicle charge transfer system of Example 1 is disclosed, wherein the charging cable comprises two ends, and wherein a charging nozzle is disposed on each of the two ends.

In Example 6, the vehicle-to-vehicle charge transfer system of Example 5 is disclosed, wherein both charging nozzles are configured with either male nozzle-to-vehicle connections or with female nozzle-to-vehicle connections.

In Example 7, the vehicle-to-vehicle charge transfer system of Example 1 is disclosed, wherein the donation control unit is further configured to require a user authorization before transferring the electric charge from the first vehicle to the second vehicle.

In Example 8, the vehicle-to-vehicle charge transfer system of Example 7 is disclosed, wherein the user authorization is validated with at least one of a user password, a user PIN, a user identification, or a biometric marker.

In Example 9, the vehicle-to-vehicle charge transfer system of Example 1 is disclosed, wherein the donation control unit is further configured to obtain from the first vehicle at least one of a first vehicle input voltage, a first vehicle maximum supported currency, and a first vehicle minimum required capacity.

In Example 10, the vehicle-to-vehicle charge transfer system of Example 1 is disclosed, wherein the donation control unit is further configured to determine a magnitude of electric charge transfer based on at least one of estimated driving distance of the first vehicle following charge transfer, distance to a charging station, distance to charging station in direction of travel of the second vehicle, expected charge time, and estimated charge cost.

In Example 11, the vehicle-to-vehicle charge transfer system of Example 1 is disclosed, wherein the donation control unit is further configured to negotiate with the second vehicle a price for the electric charge transfer.

In Example 12, the vehicle-to-vehicle charge transfer system of Example 1 is disclosed, wherein the donation control unit is further configured to process payment for the electric charge.

In Example 13, the vehicle-to-vehicle charge transfer system of Example 1 is disclosed, further comprising a timer configured to control the charge transfer according to a predetermined charging time.

In Example 14, the vehicle-to-vehicle charge transfer system of Example 1 is disclosed, further comprising a charging unit configured to perform at least one of converting the charge from direct current to alternating current, changing a voltage of the charge, and changing a frequency of the charge.

In Example 15, a vehicle-to-vehicle charge transfer apparatus is disclosed, comprising, a charging cable, configured to connect a first electric vehicle to a second electric vehicle; and a donation control unit, configured to receive one or more vehicle charge transfer parameters from the second vehicle; and transfer an electric charge from the first electric vehicle to the second electric vehicle along the charging cable according to the one or more received vehicle charge transfer parameters In Example 16, the vehicle-to-vehicle charge transfer apparatus of Example 15 is disclosed, wherein the vehicle-to-vehicle charge transfer apparatus further comprises a battery, configured to store an electric charge is disclosed, wherein battery is located within the first vehicle, and wherein the donation control unit is configured to transfer the electric charge from the battery to the second vehicle.

In Example 17, the vehicle-to-vehicle charge transfer apparatus of Example 15 is disclosed, wherein the donation control unit is further configured to adapt the electric charge to satisfy the one or more second vehicle charge parameters.

In Example 18, the vehicle-to-vehicle charge transfer apparatus of Example 17 is disclosed, wherein adapting the electric charge to satisfy the one or more second vehicle charge parameters comprises at least one of converting the electric charge from direct current to alternating current, modifying a voltage, and modifying a charge frequency.

In Example 19, the vehicle-to-vehicle charge transfer apparatus of Example 15 is disclosed, wherein the charging cable comprises two ends, and wherein a charging nozzle is disposed on each of the two ends.

In Example 20, the vehicle-to-vehicle charge transfer apparatus of Example 19 is disclosed, wherein both charging nozzles are configured with either male nozzle-to-vehicle connections or with female nozzle-to-vehicle connections.

In Example 21, the vehicle-to-vehicle charge transfer apparatus of Example 15 is disclosed, wherein the donation control unit is further configured to require a user authorization before transferring the electric charge from the first vehicle to the second vehicle.

In Example 22, the vehicle-to-vehicle charge transfer apparatus of Example 21 is disclosed, wherein the user authorization is validated with at least one of a user password, a user PIN, a user identification, or a biometric marker.

In Example 23, the vehicle-to-vehicle charge transfer apparatus of Example 15 is disclosed, wherein the donation control unit is further configured to obtain from the first vehicle at least one of a first vehicle input voltage, a first vehicle maximum supported currency, and a first vehicle minimum required capacity.

In Example 24, the vehicle-to-vehicle charge transfer apparatus of Example 15 is disclosed, wherein the donation control unit is further configured to determine a magnitude of electric charge transfer based on at least one of estimated driving distance of the first vehicle following charge transfer, distance to a charging station, distance to charging station in direction of travel of the second vehicle, expected charge time, and estimated charge cost.

In Example 25, the vehicle-to-vehicle charge transfer apparatus of Example 15 is disclosed, wherein the donation control unit is further configured to negotiate with the second vehicle a price for the electric charge transfer.

In Example 26, the vehicle-to-vehicle charge transfer apparatus of Example 15 is disclosed, wherein the donation control unit is further configured to process payment for the electric charge.

In Example 27, the vehicle-to-vehicle charge transfer apparatus of Example 15 is disclosed, further comprising a timer configured to control the charge transfer according to a predetermined charging time.

In Example 28, the vehicle-to-vehicle charge transfer apparatus of Example 15 is disclosed, further comprising a charging unit configured to perform at least one of converting the charge from direct current to alternating current, changing a voltage of the charge, and changing a frequency of the charge.

In Example 29, a donation control unit is disclosed, comprising one or more processors configured to: receive one or more vehicle charge transfer parameters from a second electric vehicle; and transfer an electric charge from a first electric vehicle to the second electric vehicle according to the one or more received vehicle charge transfer parameters; wherein the charge is transfers via a charging cable that connects the first electric vehicle to the second electric vehicle.

In Example 30, the donation control unit of Example 29 is disclosed, wherein the donation control unit is further configured to adapt the electric charge to satisfy the one or more second vehicle charge parameters.

In Example 31, the donation control unit of Example 30 is disclosed, wherein adapting the electric charge to satisfy the one or more second vehicle charge parameters comprises at least one of converting the electric charge from direct current to alternating current, modifying a voltage, and modifying a charge frequency.

In Example 32, the donation control unit of Example 29 is disclosed, wherein the donation control unit is further configured to require a user authorization before transferring the electric charge from the first vehicle to the second vehicle.

In Example 33, the donation control unit of Example 32 is disclosed, wherein the user authorization is validated with at least one of a user password, a user PIN, a user identification, or a biometric marker.

In Example 34, the donation control unit of Example 29 is disclosed, wherein the donation control unit is further configured to obtain from the first vehicle at least one of a first vehicle input voltage, a first vehicle maximum supported currency, and a first vehicle minimum required capacity.

In Example 35, the donation control unit of Example 29 is disclosed, wherein the donation control unit is further configured to determine a magnitude of electric charge transfer based on at least one of estimated driving distance of the first vehicle following charge transfer, distance to a charging station, distance to charging station in direction of travel of the second vehicle, expected charge time, and estimated charge cost.

In Example 36, the donation control unit of Example 29 is disclosed, wherein the donation control unit is further configured to negotiate with the second vehicle a price for the electric charge transfer.

In Example 37, the donation control unit of Example 29 is disclosed, wherein the donation control unit is further configured to process payment for the electric charge.

In Example 38, the donation control unit of Example 29 is disclosed, further comprising a timer configured to control the charge transfer according to a predetermined charging time.

In Example 39, the donation control unit of Example 29 is disclosed, further comprising a charging unit configured to perform at least one of converting the charge from direct current to alternating current, changing a voltage of the charge, and changing a frequency of the charge.

In Example 40, an electric vehicle is disclosed comprising,
a charging cable, configured to connect the electric vehicle to a second electric vehicle; and a donation control unit, configured to receive one or more vehicle charge transfer parameters from the second vehicle; and transfer an electric charge from the electric vehicle to the second electric vehicle along the charging cable according to the one or more received vehicle charge transfer parameters In Example 41, the electric vehicle of Example 40 is disclosed, wherein the vehicle further comprises a battery, configured to store an electric charge is disclosed, wherein battery is located within the first vehicle, and wherein the donation control unit is configured to transfer the electric charge from the battery to the second vehicle.

In Example 42, the electric vehicle of Example 40 is disclosed, wherein the donation control unit is further configured to adapt the electric charge to satisfy the one or more second vehicle charge parameters.

In Example 43, the electric vehicle of Example 42 is disclosed, wherein adapting the electric charge to satisfy the one or more second vehicle charge parameters comprises at least one of converting the electric charge from direct current to alternating current, modifying a voltage, and modifying a charge frequency.

In Example 44, the electric vehicle of Example 40 is disclosed, wherein the charging cable comprises two ends, and wherein a charging nozzle is disposed on each of the two ends.

In Example 45, the electric vehicle of Example 44 is disclosed, wherein both charging nozzles are configured with either male nozzle-to-vehicle connections or with female nozzle-to-vehicle connections.

In Example 46, the electric vehicle of Example 40 is disclosed, wherein the donation control unit is further configured to require a user authorization before transferring the electric charge from the first vehicle to the second vehicle.

In Example 47, the electric vehicle of Example 46 is disclosed, wherein the user authorization is validated with at least one of a user password, a user PIN, a user identification, or a biometric marker.

In Example 48, the electric vehicle of Example 40 is disclosed, wherein the donation control unit is further configured to obtain from the first vehicle at least one of a first vehicle input voltage, a first vehicle maximum supported currency, and a first vehicle minimum required capacity.

In Example 49, the electric vehicle of Example 40 is disclosed, wherein the donation control unit is further configured to determine a magnitude of electric charge transfer based on at least one of estimated driving distance of the first vehicle following charge transfer, distance to a charging station, distance to charging station in direction of travel of the second vehicle, expected charge time, and estimated charge cost.

In Example 50, the electric vehicle of Example 40 is disclosed, wherein the donation control unit is further configured to negotiate with the second vehicle a price for the electric charge transfer.

In Example 51, the electric vehicle of Example 40 is disclosed, wherein the donation control unit is further configured to process payment for the electric charge.

In Example 52, the electric vehicle of Example 40 is disclosed, further comprising a timer configured to control the charge transfer according to a predetermined charging time.

In Example 53, the electric vehicle of Example 40 is disclosed, further comprising a charging unit configured to perform at least one of converting the charge from direct current to alternating current, changing a voltage of the charge, and changing a frequency of the charge.

In Example 54, a method of vehicle-to-vehicle electric charge transfer is disclosed comprising, connecting a first electric vehicle to a second electric vehicle via a charging cable; receiving from the second vehicle one or more vehicle charge transfer parameters; and transferring an electric charge from the first electric vehicle to the second electric vehicle along the charging cable according to the one or more received vehicle charge transfer parameters.

In Example 55, the method of Example 54 is disclosed, further comprising adapting the electric charge to satisfy the one or more second vehicle charge parameters.

In Example 56, the method of Example 55 is disclosed, wherein adapting the electric charge to satisfy the one or more second vehicle charge parameters comprises at least one of converting the electric charge from direct current to alternating current, modifying a voltage, and modifying a charge frequency.

In Example 57, the method of Example 54 is disclosed, wherein the charging cable comprises two ends, and wherein a charging nozzle is disposed on each of the two ends.

In Example 58, the method of Example 57 is disclosed, wherein both charging nozzles are configured with either male nozzle-to-vehicle connections or with female nozzle-to-vehicle connections.

In Example 59, the method of Example 54 is disclosed, further comprising requiring a user authorization before transferring the electric charge from the first vehicle to the second vehicle.

In Example 60, the method of Example 59 is disclosed, wherein the user authorization is validated with at least one of a user password, a user PIN, a user identification, or a biometric marker.

In Example 61, the method of Example 54 is disclosed, further comprising obtaining from the first vehicle at least one of a first vehicle input voltage, a first vehicle maximum supported currency, and a first vehicle minimum required capacity.

In Example 62, the method of Example 54 is disclosed, further comprising determining a magnitude of electric charge transfer based on at least one of estimated driving distance of the first vehicle following charge transfer, distance to a charging station, distance to charging station in direction of travel of the second vehicle, expected charge time, and estimated charge cost.

In Example 63, the method of Example 54 is disclosed, further comprising negotiating with the second vehicle a price for the electric charge transfer.

In Example 64, the method of Example 54 is disclosed, further comprising processing payment for the electric charge.

In Example 65, the method of Example 54 is disclosed, further comprising controlling the charge transfer according to a predetermined charging time.

In Example 66, the method of Example 54 is disclosed, further comprising performing at least one of converting the charge from direct current to alternating current, changing a voltage of the charge, and changing a frequency of the charge.

In Example 67, a means for vehicle-to-vehicle charge transfer is disclosed, comprising, an electrical connection means, configured to connect a first electric vehicle to a second electric vehicle; and a donation control means, configured to receive one or more vehicle charge transfer parameters from the second vehicle; and transfer an electric charge from the first electric vehicle to the second electric vehicle along the electrical connection means according to the one or more received vehicle charge transfer parameters In Example 68, the means for vehicle-to-vehicle charge transfer of Example 67 is disclosed, wherein the means for vehicle-to-vehicle charge transfer further comprises a electrical charge storage means, configured to store an electric charge is disclosed, wherein electrical charge storage means is located within the first vehicle, and wherein the donation control means is configured to transfer the electric charge from the electrical charge storage means to the second vehicle.

In Example 69, the means for vehicle-to-vehicle charge transfer of Example 67 is disclosed, wherein the donation control means is further configured to adapt the electric charge to satisfy the one or more second vehicle charge parameters.

In Example 70, the means for vehicle-to-vehicle charge transfer of Example 69 is disclosed, wherein adapting the electric charge to satisfy the one or more second vehicle charge parameters comprises at least one of converting the electric charge from direct current to alternating current, modifying a voltage, and modifying a charge frequency.

In Example 71, the means for vehicle-to-vehicle charge transfer of Example 67 is disclosed, wherein the electrical connection means comprises two ends, and wherein a charging nozzle is disposed on each of the two ends.

In Example 72, the means for vehicle-to-vehicle charge transfer of Example 71 is disclosed, wherein both charging nozzles are configured with either male nozzle-to-vehicle connections or with female nozzle-to-vehicle connections.

In Example 73, the means for vehicle-to-vehicle charge transfer of Example 67 is disclosed, wherein the donation control means is further configured to require a user authorization before transferring the electric charge from the first vehicle to the second vehicle.

In Example 74, the means for vehicle-to-vehicle charge transfer of Example 73 is disclosed, wherein the user authorization is validated with at least one of a user password, a user PIN, a user identification, or a biometric marker.

In Example 75, the means for vehicle-to-vehicle charge transfer of Example 67 is disclosed, wherein the donation control means is further configured to obtain from the first vehicle at least one of a first vehicle input voltage, a first vehicle maximum supported currency, and a first vehicle minimum required capacity.

In Example 76, the means for vehicle-to-vehicle charge transfer of Example 67 is disclosed, wherein the donation control means is further configured to determine a magnitude of electric charge transfer based on at least one of estimated driving distance of the first vehicle following charge transfer, distance to a charging station, distance to charging station in direction of travel of the second vehicle, expected charge time, and estimated charge cost.

In Example 77, the means for vehicle-to-vehicle charge transfer of Example 67 is disclosed, wherein the donation control means is further configured to negotiate with the second vehicle a price for the electric charge transfer.

In Example 78, the means for vehicle-to-vehicle charge transfer of Example 67 is disclosed, wherein the donation control means is further configured to process payment for the electric charge.

In Example 79, the means for vehicle-to-vehicle charge transfer of Example 67 is disclosed, further comprising a timing means configured to control the charge transfer according to a predetermined charging time.

In Example 80, the means for vehicle-to-vehicle charge transfer of Example 67 is disclosed, further comprising a charging conversion means configured to perform at least one of converting the charge from direct current to alternating current, changing a voltage of the charge, and changing a frequency of the charge.

In Example 81, a non-transient computer readable medium is disclosed, configured to cause one or more processors to perform the method of: connecting a first electric vehicle to a second electric vehicle via a charging cable; receiving from the second vehicle one or more vehicle charge transfer parameters; and transferring an electric charge from the first electric vehicle to the second electric vehicle along the charging cable according to the one or more received vehicle charge transfer parameters.

In Example 82, a non-transient computer readable medium is disclosed, configured to cause one or more processors to perform the method of any one of Examples 54 through 66.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A vehicle-to-vehicle charge transfer system, comprising:
   a charging cable, configured to connect a first electric vehicle to a second electric vehicle; and
   a donation control unit, configured to
      receive one or more vehicle charge transfer parameters from the second vehicle via the charging cable; and
      transfer an electric charge in a vehicle-to-vehicle manner from the first electric vehicle to the second electric vehicle along the charging cable according to the one or more received vehicle charge transfer parameters;
   wherein the vehicle charge transfer parameters comprise a maximum supported voltage of the second vehicle; and
   wherein the donation control unit is further configured to adapt a voltage of its electric charge to transfer the electric charge in the vehicle-to-vehicle manner from the first electric vehicle to the second electric vehicle at the maximum supported output voltage.

2. The vehicle-to-vehicle charge transfer system of claim 1, wherein the donation control unit is further configured to adapt the electric charge to satisfy the one or more second vehicle charge parameters, and wherein adapting the electric charge to satisfy the one or more second vehicle charge parameters comprises modifying a charge frequency.

3. The vehicle-to-vehicle charge transfer system of claim 1, wherein the charging cable comprises two ends, and wherein a charging nozzle is disposed on each of the two ends, and wherein both charging nozzles are configured with either male nozzle-to-vehicle connections or with female nozzle-to-vehicle connections.

4. The vehicle-to-vehicle charge transfer system of claim 1, wherein the donation control unit is further configured to require a user authorization before transferring the electric charge from the first vehicle to the second vehicle, wherein the user authorization is validated with at least one of a user password, a user PIN, a user identification, or a biometric marker.

5. The vehicle-to-vehicle charge transfer system of claim 1, wherein the donation control unit is further configured to obtain from the first vehicle at least one of a first vehicle input voltage, a first vehicle maximum supported currency, and a first vehicle minimum required capacity.

6. The vehicle-to-vehicle charge transfer system of claim 1, wherein the donation control unit is further configured to determine a magnitude of electric charge transfer based on at least one of estimated driving distance of the first vehicle following charge transfer, distance to a charging station, distance to charging station in direction of travel of the second vehicle, expected charge time, and estimated charge cost.

7. The vehicle-to-vehicle charge transfer system of claim 1, wherein the donation control unit is further configured to negotiate with the second vehicle a price for the electric charge transfer.

8. The vehicle-to-vehicle charge transfer system of claim 1, wherein the donation control unit is further configured to process payment for the electric charge.

9. The vehicle-to-vehicle charge transfer system of claim 1, further comprising a charging unit configured to perform at least one of converting the charge from direct current to alternating current, changing a voltage of the charge, and changing a frequency of the charge.

10. The vehicle-to-vehicle charge transfer system of claim 1, wherein the vehicle charge transfer parameters comprise one or more of a voltage to be transferred, a magnitude of electrical current to be transferred, a frequency of an electric current to be transferred, and/or whether the electric current to be transferred should be AC current or DC current.

11. The vehicle-to-vehicle charge transfer system of claim 1, wherein the one or more vehicle charge transfer parameters include charging via alternating current, and wherein the donation control unit is further configured to convert its outputted electric charge from direct current to alternating current to satisfy the vehicle charge transfer parameter to charge via alternating current.

12. A method of vehicle-to-vehicle electric charge transfer comprising:
    connecting a first electric vehicle to a second electric vehicle via a charging cable;
    receiving from the second vehicle one or more vehicle charge transfer parameters via the charging cable, wherein the one or more vehicle charge transfer parameters comprise a maximum supported voltage of the second vehicle; and
    adapting the electric charge to satisfy the maximum supported voltage of the second vehicle by adapting its output voltage to the maximum supported output voltage;
    transferring an electric charge in a vehicle-to-vehicle manner from the first electric vehicle to the second electric vehicle along the charging cable according to the maximum supported output voltage.

13. The method of claim 12, further comprising adapting the electric charge to satisfy the one or more second vehicle charge parameters, and wherein adapting the electric charge to satisfy the one or more second vehicle charge parameters comprises modifying a charge frequency.

14. The method of claim 12, further comprising obtaining from the first vehicle at least one of a first vehicle input voltage, a first vehicle maximum supported currency, and a first vehicle minimum required capacity.

15. The method of claim 12, further comprising determining a magnitude of electric charge transfer based on at least one of estimated driving distance of the first vehicle following charge transfer, distance to a charging station, distance to charging station in direction of travel of the second vehicle, expected charge time, and estimated charge cost.

16. The method of claim 12, further comprising negotiating with the second vehicle a price for the electric charge transfer.

17. The method of claim 12, further comprising processing payment for the electric charge.

18. The method of claim 12, further comprising performing at least one of converting the charge from direct current to alternating current, changing a voltage of the charge, and changing a frequency of the charge.

19. A donation control unit, comprising one or more processors configured to:
    receive one or more vehicle charge transfer parameters from a second electric vehicle via a charging cable connected to the second electric vehicle; and
    transfer an electric charge in a vehicle-to-vehicle manner from a first electric vehicle to the second electric vehicle according to the one or more received vehicle charge transfer parameters;
    wherein the charge is transferred via a charging cable that connects the first electric vehicle to the second electric vehicle wherein one or more processors are further configured to receive a communication signal from the second vehicle representing the vehicle charge transfer parameters via the charging cable;
    wherein the vehicle charge transfer parameters comprise a maximum supported voltage of the second vehicle; and
    wherein the one or more processors are further configured to control a voltage adapter to adapt a voltage to transfer the electric charge in the vehicle-to-vehicle manner from the first electric vehicle to the second electric vehicle at the maximum supported output voltage.

20. The donation control unit of claim 19, wherein the donation control unit is further configured to adapt the electric charge to satisfy the one or more second vehicle charge parameters, and wherein adapting the electric charge to satisfy the one or more second vehicle charge parameters comprises modifying a charge frequency.

* * * * *